United States Patent [19]

Ripper

[11] 4,433,667

[45] Feb. 28, 1984

[54] APPARATUS FOR REGULATING THE EXHAUST GAS RECIRCULATION RATE IN INTERNAL COMBUSTION ENGINES HAVING SELF-IGNITION

[75] Inventor: Wolfgang Ripper, Stuttgart, Fed. Rep. of Germany

[73] Assignee: Robert Bosch GmbH, Stuttgart, Fed. Rep. of Germany

[21] Appl. No.: 398,730

[22] Filed: Jul. 15, 1982

[30] Foreign Application Priority Data

Sep. 2, 1981 [DE] Fed. Rep. of Germany ....... 3134631

[51] Int. Cl.$^3$ ........................................... F02M 25/06
[52] U.S. Cl. .................................... 123/569; 123/571
[58] Field of Search ............... 123/569, 571, 568, 501, 123/505

[56] References Cited

U.S. PATENT DOCUMENTS

| | | | |
|---|---|---|---|
| 3,906,207 | 9/1975 | Rivere et al. ........................ | 123/571 |
| 4,153,013 | 5/1979 | Bianchi et al. ...................... | 123/571 |
| 4,181,944 | 1/1980 | Yamauchi et al. ................... | 123/569 |
| 4,279,235 | 7/1981 | Faig et al. .......................... | 123/571 X |
| 4,367,716 | 1/1983 | Yasuhara .......................... | 123/501 X |
| 4,375,800 | 3/1983 | Otsuka et al. ..................... | 123/569 X |
| 4,381,748 | 5/1983 | Eckert et al. ..................... | 123/571 X |
| 4,387,694 | 6/1983 | Yoshiba et al. .................... | 123/569 |
| 4,397,283 | 8/1983 | Komaroff et al. ............. | 123/501 X |

FOREIGN PATENT DOCUMENTS

| | | | |
|---|---|---|---|
| 2449836 | 4/1976 | Fed. Rep. of Germany ...... | 123/571 |
| 2635325 | 3/1977 | Fed. Rep. of Germany ...... | 123/571 |
| 53-25728 | 3/1978 | Japan .................................. | 123/571 |
| 53-32234 | 3/1978 | Japan .................................. | 123/571 |
| 54-58135 | 5/1979 | Japan .................................. | 123/571 |
| 2049229 | 12/1980 | United Kingdom ................ | 123/571 |

*Primary Examiner*—Wendell E. Burns
*Attorney, Agent, or Firm*—Edwin E. Greigg

[57] ABSTRACT

An apparatus for regulating the exhaust gas recycling rate in an internal combustion engine having self-ignition is proposed, in which a set-point or nominal ignition delay value is ascertained, and the actual ignition delay value is regulated to this nominal value. The nominal ignition delay value is efficaciously derived from a multi-dimensional memory, the coordinate values of which are dependent on at least load and rpm. The ignition delay time is ascertained from a comparison of the signal for the injection onset of an injection nozzle, for instance, and the signal of a pressure sensor communicating with the combustion chamber.

11 Claims, 2 Drawing Figures

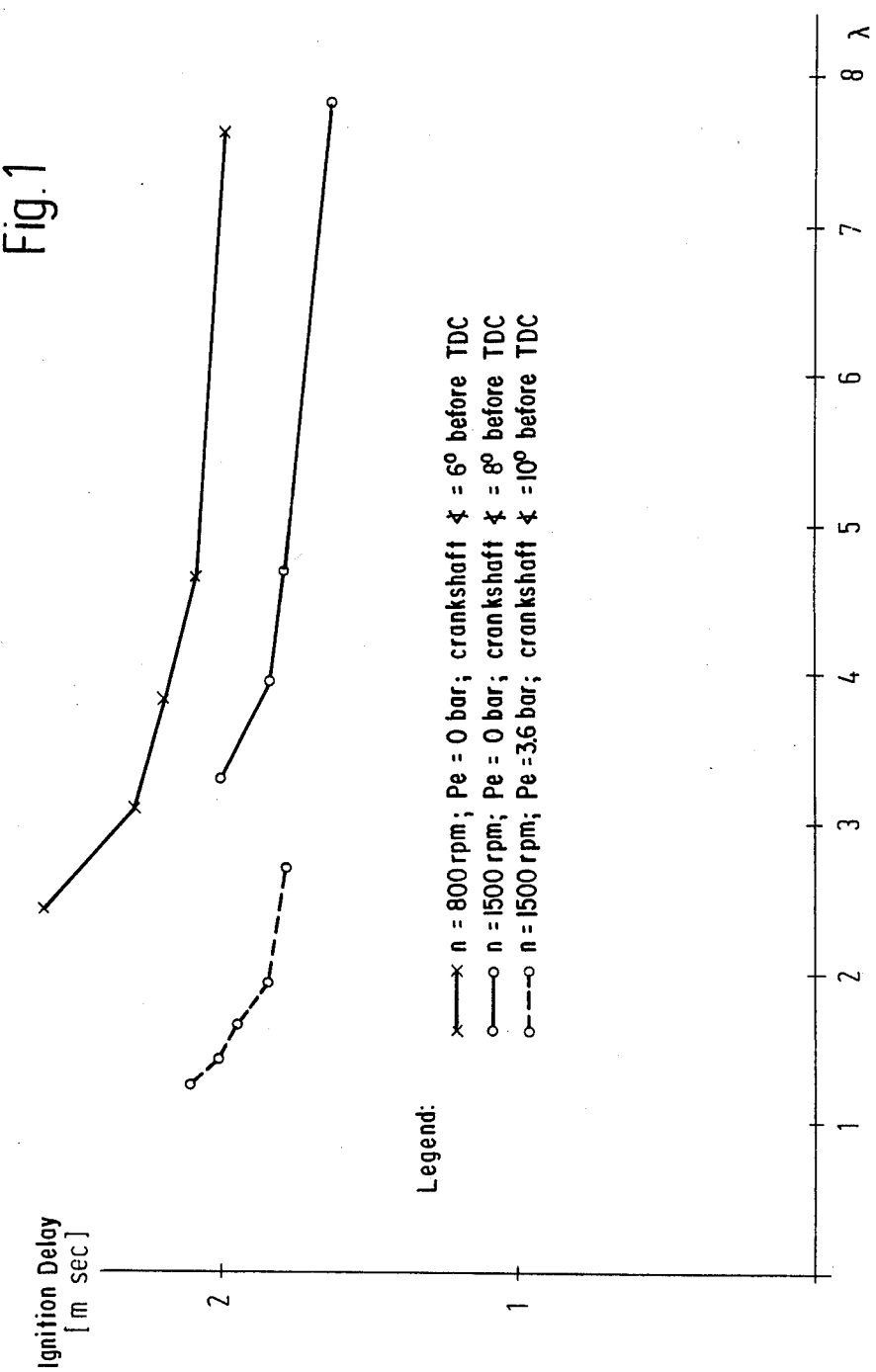

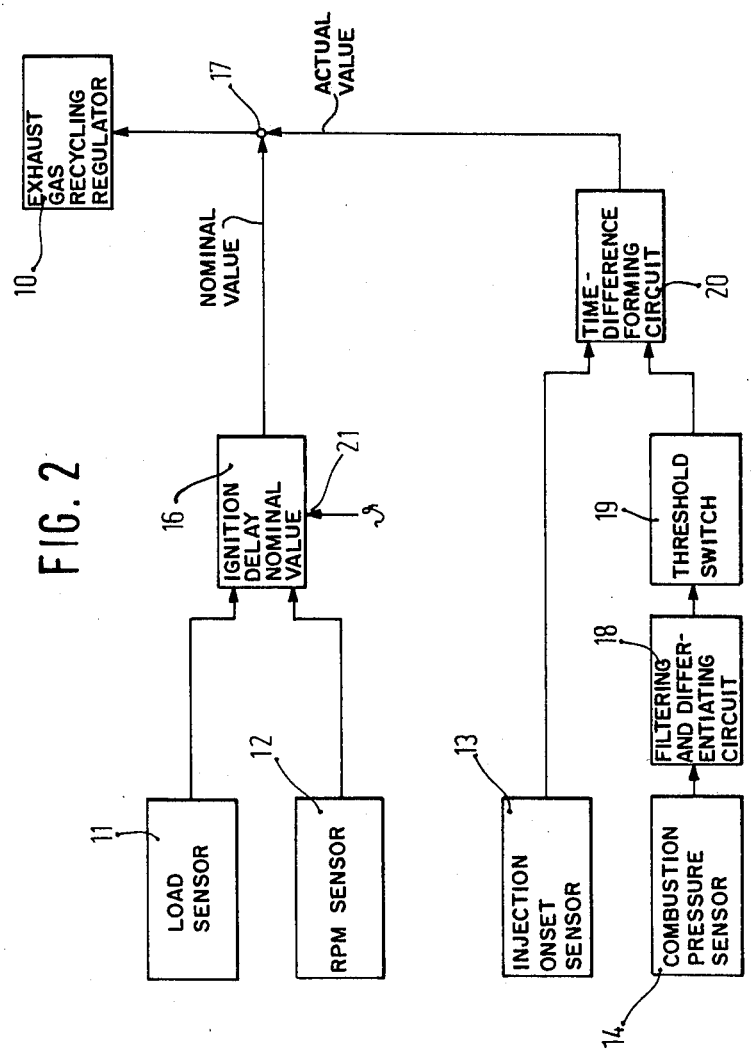

APPARATUS FOR REGULATING THE EXHAUST GAS RECIRCULATION RATE IN INTERNAL COMBUSTION ENGINES HAVING SELF-IGNITION

BACKGROUND OF THE INVENTION

The present invention relates to a control device for regulating the exhaust gas recycling rate in an internal combustion engine with self-ignition.

As a rule, the exhaust gas recycling rate in a Diesel engine is controlled at least in accordance with load and in an open-loop or closed-loop fashion. This is done in order to attain an exhaust gas low in toxic components. It is true that the known systems produce useful results as a rule; however, the optimum attainable result cannot be achieved with such systems, because the combustion processes themselves are not monitored and evaluated.

OBJECT AND SUMMARY OF THE INVENTION

It is an object of the present invention to control ignition delay to specific values, which depend upon operating conditions of the engine, by controlling the exhaust gas recycling rate.

According to the present invention actual values of the ignition delay are generated from injection onset or fuel supply onset signals as well as combustion pressure. The actual value signal is compared to a generated nominal value signal and the exhaust gas recycling rate is adjusted according to the difference between the nominal value signal and the actual value signal.

With the control device according to the present invention for regulating the exhaust gas recycling rate optimization is attainable, in contrast to the prior art, because of the inclusion of combustion-specific values as well; the result is that the exhaust gas is correspondingly low in toxic components.

The invention will be better understood and further objects and advantages thereof will become more apparent from the ensuing detailed description of a preferred embodiment taken in conjuncton with the drawings.

BRIEF DESCRIPTION OF THE DRAWINGS

FIG. 1 is a diagram showing the ignition delay given various engine-specific data; and FIG. 2 is a block circuit diagram for the apparatus according to the invention.

DESCRIPTION OF THE PREFERRED EMBODIMENT

The exemplary embodiment relates to a control device for regulating the exhaust gas recycling rate in an internal combustion engine having self-ignition, in which a set-point ignition delay is ascertained from load and rpm values, and the actual ignition delay is regulated to this set-point value.

The diagram of FIG. 1 serves to explain this control device. The ignition delay is plotted in this diagram over calculated $\lambda$ values, for three different operating states of a Diesel engine. The $\lambda$ values plotted along the abscissa were ascertained by computational means, in that the supplied fresh-air quantity and the injected fuel quantity were each measured and the corresponding ratio between them was determined.

FIG. 2, in the form of a block circuit diagram, shows the apparatus according to the present invention for regulating the exhaust gas recirculation rate in an internal combustion engine having self-ignition. Reference numeral 10 indicates a regulator, known per se, for the exhaust gas recycling rate of a Diesel engine (not shown). The apparatus (for example, a governor rod travel sensor) includes a load sensor 11, an rpm sensor 12, an injection onset, or supply onset, sensor 13 and a combustion pressure sensor 14. From the signals for load and rpm a set-point value for the ignition delay is read out of a set-point, or nominal cotrol circuit 16, which stores data in the form of a performance graph, and is delivered to a subsequent comparison point 17 for set-point/actual-value comparison.

The combustion pressure sensor 14 emits its output signal to a filtering and differentiation circuit 18 and subsequently to a threshold switch 19. A time-difference-forming circuit 20 follows and ascertains the actual value of the ignition delay, determined by considering the injection onset, the signal for which is derived from the injection onset, or supply onset, sensor 13, and the processed output signal of the combustion pressure sensor 14. A control of the regulator 10 for the exhaust gas recycling rate is then effected in accordance with the deviation between the set point and the actual value at the comparison point 17.

With this apparatus for regulating the exhaust gas recycling rate according to FIG. 2, the exhaust gas component of the cylinder charge is thus regulated in accordance with the specific ignition delay. The actual value for this ignition delay is naturally specific for a particular engine type and is dependent on the most important operating characteristics, such as load and rpm. An opportunity to effect regulation in accordance with temperature is illustrated by a specialized control input 21 feed into the nominal value control circuit 16. In principle, all the influential variables which more or less precisely detect the load status of the engine can be used as a load signal. For instance, the position of the governor rods of an injection pump or the measured value for the metered fuel quantity can be used directly for such a purpose.

As far as the injection onset sensor is concerned, here again various opportunities present themselves, such as a needle stroke transducer in the vicinity of the injection nozzle, or a fuel line pressure sensor communicating with the fuel line.

As combustion pressure transducers, piezo-pressure sensors communicating directly with the combustion chamber have proved to be effective. However, knocking sensors which detect the course of the combustion pressure via the evaluation of the sound conducted through the engine are also conceivable in principle. In the case of a piezo-pressure sensor, the sensor output signal is efficaciously differentiated (although it is also possible merely to process the amplitude values) and then an interrogation as to a threshold value is performed. Depending upon the sensor used, specially designed filters may also be required, in order to filter out stray signals.

The individual components of the apparatus sketched in FIG. 2 for regulating the exhaust gas recycling rate in a Diesel engine are known per se, so that they need not be explained in further detail. What is of the essence is only that the dependency of the ignition delay on the exhaust gas recyclng rate be exploited in a purposeful manner in order to regulate this exhaust gas recycling rate.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. In a control device for regulating the exhaust gas recycling rate in an internal combustion engine with self-ignition, the improvement comprising:

means for detecting the ignition delay in at least one cylinder of the engine and generating an actual value signal proportional thereto;

means for generating a nominal value signal of the ignition delay which is dependent on engine operating characteristics; and means for adjusting the actual value signal to the nominal value signal.

2. In the control device as defined in claim 1, wherein the means for generating the nominal value signal depends upon at least engine load and rpm in generating the nominal value signal.

3. In the control device as defined in claim 1, wherein the means for generating the actual value signal includes:

means for generating a signal proportional to injection onset;

means for generating a signal proportional to combustion pressure; and means for receiving the injection onset signal and the combustion pressure signal and generating the actual value signal as a function of the time difference between the injection onset and combustion pressure signals.

4. In the control device as defined in claim 3, wherein the means for generating the signal proportional to combustion pressure comprises a pressure sensor which communicates directly with the combustion chamber.

5. In the control device as defined in claim 3, wherein the means for generating the signal proportional to combustion pressure comprises a pressure sensor which communicates indirectly with the combustion chamber.

6. In the control device as defined in claim 3, wherein the means for generating the actual value signal further includes:

means for filtering and amplifying the signal proportional to combustion pressure; and a threshold switch connected to the means for filtering and amplifying.

7. In the control device as defined in claim 3, wherein the means for generating the actual value signal further includes:

means for filtering and differentiating the signal proportional to combustion pressure.

8. In the control device as defined in claim 1, wherein the means for generating the actual value signal includes:

means for generating a signal proportional to fuel supply onset;

means for generating a signal proportional to combustion pressure; and means for receiving the fuel supply onset signal and the combustion pressure signal and generating the actual value signal as a function of the time difference between the fuel supply onset and combustion pressure signals.

9. In the control device as defined in claim 8, wherein the means for generating the signal proportional to combustion pressure comprises a pressure sensor which communicates directly with the combustion chamber.

10. In the control device as defined in claim 8, wherein the means for generating the signal proportional to combustion pressure comprises a pressure sensor which communicates indirectly with the combustion chamber.

11. In the control device as defined in claim 8, wherein the means for generating the actual value signal further includes:

means for filtering and amplifying the signal proportional to combustion pressure; and a threshold switch connected to the means for filtering and amplifying.

* * * * *